(12) United States Patent
Graaf et al.

(10) Patent No.: US 10,449,834 B2
(45) Date of Patent: Oct. 22, 2019

(54) REFRIGERANT CIRCUIT FOR A VEHICLE AIR CONDITIONING SYSTEM WITH HEAT PUMP

(71) Applicant: Hanon Systems, Daejeon (KR)

(72) Inventors: Marc Graaf, Krefeld (DE); Gerald Richter, Aachen (DE)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/334,824

(22) Filed: Oct. 26, 2016

(65) Prior Publication Data

US 2017/0113515 A1 Apr. 27, 2017

(51) Int. Cl.
| | |
|---|---|
| B60H 1/32 | (2006.01) |
| B60H 1/22 | (2006.01) |
| B60H 1/00 | (2006.01) |
| F25B 6/04 | (2006.01) |
| F25B 5/04 | (2006.01) |
| F25B 41/00 | (2006.01) |
| F25B 1/00 | (2006.01) |

(52) U.S. Cl.
CPC ......... B60H 1/323 (2013.01); B60H 1/00385 (2013.01); B60H 1/00899 (2013.01); B60H 1/2225 (2013.01)

(58) Field of Classification Search
CPC .. B60H 1/323; B60H 1/2225; B60H 1/00899; B60H 1/00385; B60H 1/00921; F25B 6/04; F25B 5/04; F25B 2341/0662
USPC ......................................................... 62/115
See application file for complete search history.

(56) References Cited

U.S. PATENT DOCUMENTS

| | | | | |
|---|---|---|---|---|
| 4,356,965 A | * | 11/1982 | Matsushima | ...... B60H 1/00064 165/42 |
| 4,560,103 A | * | 12/1985 | Schulz | ............... B60H 1/00035 236/13 |
| 5,355,690 A | * | 10/1994 | Iritani | ................ B60H 1/00392 62/184 |
| 5,910,157 A | * | 6/1999 | Noda | ................. B60H 1/00914 165/43 |
| 6,254,475 B1 | | 7/2001 | Danieau et al. | |
| 7,028,501 B2 | * | 4/2006 | Casar | ................. B60H 1/00899 165/240 |
| 2006/0137388 A1 | * | 6/2006 | Kakehashi | ............. B60H 1/323 62/513 |
| 2007/0125520 A1 | * | 6/2007 | Nutsos | ............... B60H 1/00585 165/95 |
| 2007/0193292 A1 | * | 8/2007 | Itoh | ..................... B60H 1/00207 62/239 |

(Continued)

FOREIGN PATENT DOCUMENTS

| | | |
|---|---|---|
| CN | 102950992 A | 3/2013 |
| CN | 103673170 A | 3/2014 |

(Continued)

*Primary Examiner* — Frantz F Jules
*Assistant Examiner* — Steve S Tanenbaum
(74) *Attorney, Agent, or Firm* — Shumaker, Loop & Kendrick, LLP; James D. Miller

(57) ABSTRACT

A refrigerant circuit for a vehicle air conditioning system with heat pump function includes at least one evaporator, a compressor, and a condenser. The refrigerant circuit for the vehicle air conditioning system further includes an expansion element. A supplemental evaporator is arranged upstream from the compressor in a separate fluid guiding arrangement in the refrigerant circuit.

10 Claims, 2 Drawing Sheets

(56) References Cited

U.S. PATENT DOCUMENTS

| | | | | |
|---|---|---|---|---|
| 2011/0146266 A1* | 6/2011 | Weinbrenner | ...... | F02B 29/0412 60/599 |
| 2012/0240604 A1* | 9/2012 | Choi | ................ | B60H 1/00921 62/79 |
| 2012/0279243 A1* | 11/2012 | Endo | ................ | B60H 1/00921 62/238.6 |
| 2013/0333406 A1* | 12/2013 | Takahashi | .......... | B60H 1/00921 62/238.7 |
| 2014/0075973 A1* | 3/2014 | Graaf | ................ | B60H 1/00328 62/115 |
| 2015/0253045 A1* | 9/2015 | Yamada | .................... | F25B 5/04 62/324.1 |
| 2016/0101674 A1* | 4/2016 | Riviere | .................. | B60P 3/205 62/89 |

FOREIGN PATENT DOCUMENTS

| | | | |
|---|---|---|---|
| DE | 102011052752 | A | 2/2013 |
| DE | 102012108891 | A1 | 3/2014 |
| JP | S5857667 | U * | 4/1983 |
| JP | 2003175721 | A | 6/2003 |
| JP | 2007225169 | A | 9/2007 |
| JP | 2011524483 | A | 9/2011 |
| KR | 20120129076 | A | 11/2012 |
| KR | 20140032801 | A | 3/2014 |

* cited by examiner

REFRIGERANT CIRCUIT FOR A VEHICLE AIR CONDITIONING SYSTEM WITH HEAT PUMP

CROSS-REFERENCE TO RELATED APPLICATIONS

This application claims priority under 35 U.S.C. § 119 to German Patent Application No. 2015 118 221.1, filed on Oct. 26, 2015, in the German Intellectual Property Office, the disclosure of which is incorporated herein by reference in its entirety.

TECHNICAL FIELD

The invention concerns a refrigerant circuit for a vehicle air conditioning system with heat pump function.

BACKGROUND

Due to the ever improved efficiency of motor vehicle engines or due to the use of electric propulsion for motor vehicles, increasingly less waste heat is available for the comfortable heating of the vehicle cabins. Hence, supplemental heating systems are needed, which support the heating of the interior of the vehicle and thereby increase the comfort of the passengers.

Various supplemental heating systems for vehicle air conditioning systems are known from the prior art.

Besides electrical supplemental heating systems, refrigerant-based heat pumps are also being used. Here, besides the classical heat pump circuits which ensure the heating function by switching the flows of refrigerant in the refrigerant circuit, compact heat pump systems are also known, in which the functions of heating, cooling, and dehumidifying as well as the creation of any given mixed temperature can be realized by means of a standard refrigerant circuit thanks to specific interconnections at the air side of the system.

Compact motor vehicle air conditioning systems of the latter kind are known from DE 10 2012 108 891 A1 and DE 10 2011 052 752 A1, in which a warm air flow from the condenser and a cold air flow from the evaporator of the refrigerant circuit are mixed in accordance with the required expelled air temperature of the vehicle air conditioning system. The mixed air is taken through an air duct into the vehicle cabin. Thanks to an air distribution system arranged in the cabin with various outlet control elements, the air is taken to the corresponding air outlets, such as the defrost, ventilation, and foot space outlet, into the vehicle. Excess air is blown into the surroundings by additional outlets from the compact air conditioning system. These devices already have an increased efficiency and less complexity than classical heat pump systems.

The drawback to the prior art of classical heat pumps is the high complexity, due to a large number of components, associated with high costs and a low efficiency at low outside temperatures.

The drawback to compact air conditioning systems is a substantially different vehicle architecture on account of their use, which prevents an application in conventional vehicles.

SUMMARY

The problem which the invention proposes to solve is to provide a refrigerant circuit for a vehicle air conditioning system with heat pump function which enables less complexity while at the same time maintaining the conventional space partitioning in the motor vehicle and the use of standard components for the vehicle air conditioning system.

The problem is solved by an object and a method with the features according to the independent patent claims. Modifications are indicated in the dependent patent claims.

The problem of the invention is solved in particular by a refrigerant circuit for a vehicle air conditioning system with heat pump function wherein the refrigerant circuit comprises at least one evaporator, a compressor, a condenser as well as an expansion valve. Moreover, the refrigerant circuit is characterized in that a supplemental evaporator is arranged upstream from the compressor in a separate fluid guiding arrangement in the refrigerant circuit.

The fluid guiding arrangement serves the purpose of bringing the relatively warm fluid, as compared to the refrigerant, into contact with the refrigerant for heat transfer to the refrigerant. Thus, in the broader sense a fluid-fluid heat exchanger is already a fluid guiding arrangement. According to a preferred embodiment of the invention, the fluid guiding arrangement is designed as a supplemental evaporator of the refrigerant circuit, comprising a housing and optionally other components for improving the efficiency of the fluid guidance. The warm fluid used in the sense of the preceding description can be, in addition to circulating air, outside air, or engine compartment air, also supercharging air, cooling water or oil, or exhaust gas.

By a vehicle air conditioning system is meant according to the invention the entirety of the air conditioning system and refrigerant circuit. In the air conditioning system, besides the necessary components of the refrigerant circuit, other components are provided for the treating, guiding and distributing of the air flow being conditioned, such as blowers, gates, and mixing chambers, as well as, optionally, a refrigerant-based heating heat exchanger.

According to one advantageous embodiment of the invention, a supplemental heat exchanger is furthermore arranged between the compressor and the condenser in the refrigerant circuit for the direct or indirect transfer of heat to the vehicle cabin.

By the direct or indirect transfer of heat to the vehicle cabin is meant the transfer of heat from the refrigerant circuit by means of the supplemental heat exchanger by a direct pathway to the air being taken to the vehicle cabin for heating or by an indirect pathway across an intervening fluid circuit, for example.

Accordingly, the supplemental heat exchanger gives up heat from the refrigerant circuit directly in the air conditioning system to the air flow being conditioned. Alternatively, the supplemental heat exchanger gives up heat from the refrigerant circuit first of all indirectly, for example to the engine cooling circuit, and this then gives up the heat by means of the conventional heating heat exchanger to the air flow being conditioned for the vehicle cabin.

Preferably, the supplemental heat exchanger of the vehicle air conditioning system is arranged downstream from the evaporator in the air flow being conditioned for direct heat transfer to the air flow being supplied to the cabin.

In electric or hybrid vehicles, the supplemental heat exchanger of the vehicle air conditioning system is arranged at the location of the heating heat exchanger of the engine cooling circuit in the air flow being conditioned.

Especially preferably, in addition to the already mentioned heat exchanger of the vehicle air conditioning system from the refrigerant circuit, a heating heat exchanger of the engine cooling circuit or in the case of electric or hybrid vehicles at the location of the positive temperature coefficient heater (PTC) is arranged in the air flow being conditioned. The heating heat exchanger of the engine cooling circuit in internal combustion engines or the electric heater, also known as PTC, in electric or hybrid vehicles constitute an additional heat source for the heating of the air flow for the vehicle cabin.

Advantageously, the condenser of the refrigerant circuit is designed so that closable air guiding systems are provided in order to hinder or prevent a surrender of heat of the condenser to the surroundings during the heating of the air flow being conditioned by the heat exchanger in the vehicle air conditioning system.

Especially preferably, a supplemental expansion element is arranged upstream from the supplemental evaporator, which reduces the evaporation temperature level by decreasing the pressure and thus makes possible the use of heat sources of lower temperature for the heating of the passenger compartment.

The supplemental evaporator and the supplemental expansion element are preferably arranged upstream, downstream, or parallel with the evaporator in the refrigerant circuit.

Especially advantageously, the supplemental evaporator is arranged in the engine compartment or another location in the vehicle surrounded by warm air, as this allows a providing of heat via the supplemental evaporator for the heating of the passenger compartment and increasing the comfort of the passengers.

In particular, it is advantageous for the cooling function of the vehicle air conditioning system when the separate fluid guiding arrangement is provided at the inlet with a closure to prevent flow through the supplemental evaporator so as to minimize or even entirely prevent the uptake of heat through the supplemental evaporator in this operating mode.

It has furthermore proven to be advantageous for the separate fluid guiding arrangement to have a flowback closure at the outlet side, which prevents a flow through the fluid guiding arrangement in the opposite direction.

Especially preferably, the closures of the separate fluid guiding arrangement are designed as flaps. Alternatively, the closures of the fluid guiding arrangement are designed as louvers. Of course, the closures of the fluid guiding arrangement can be designed as a combination of flap and/or louver.

The heat input into the refrigerant circuit within the separate air guiding arrangement can be advantageously increased by providing a blower, since the supplemental heat fluid flow through the supplemental evaporator is increased by means of the blower.

In an especially advantageous embodiment of the invention, the separate fluid guiding arrangement is designed as an air guiding arrangement with two supplemental heat fluid connections and corresponding flaps for alternating or simultaneous flow of circulating air and/or engine compartment air through the supplemental evaporator of the fluid guiding arrangement.

The problem of the invention is furthermore solved by a method for operating a refrigerant circuit, wherein during heat pump operation a supplemental heat fluid flow moves through a separate fluid guiding arrangement and heat is taken up from the refrigerant circuit via the supplemental evaporator, which can then be surrendered in the supplemental heat exchanger to the air flow being conditioned by the vehicle air conditioning system and into the passenger cabin.

The problem of the invention is furthermore solved by a method for operating a refrigerant circuit, wherein during cooling operation the separate fluid guiding arrangement is switched so that no heat is taken up via the supplemental evaporator and the refrigerant circuit works in refrigerator mode.

The benefit of the invention consists quite generally in that the advantages of the classical refrigerant-based heat pump when using standard components in their conventional arrangement in the vehicle are combined with the advantages of the compact air conditioning system, high efficiency making use of a simple refrigerant circuit.

In concept, the problem of the invention is thus solved by a vehicle air conditioning system with integrated heat exchanger as a refrigerant condenser or gas cooler in refrigerant circuits with supercritically operating refrigerant and with a supplemental evaporator in a separate fluid guiding arrangement for supplemental uptake of heat in the heat pump function.

The refrigerant circuit of the prior art is equipped with a supplemental heat exchanger within the vehicle air conditioning system, which works as a condenser or a gas cooler, depending on the process. The supplemental heat exchanger is arranged in the circuit downstream from the compressor. Especially advantageously when the proposed vehicle air conditioning system is an air conditioning system, a conventional device is realized in the usual installation location.

In the refrigerant circuit, the usual condenser or gas cooler is arranged preferably at the front of the vehicle in the so-called cooling module and closed by air guiding systems, such as those in the form of flaps.

In this way, the unwanted surrender of heat through the condenser in the heating mode of the vehicle air conditioning system can be decreased or prevented.

After the condenser, the refrigerant flows across a throttle element to the evaporator, where energy is taken up from the surroundings. The evaporator is arranged as usual in the vehicle air conditioning system and arranged in the air flow direction upstream from the heat exchanger and upstream from the optionally present heating heat exchanger from the refrigerant circuit of the motor vehicle.

The supplemental evaporator is preferably outfitted with its own supplemental expansion valve. The supplemental evaporator and the supplemental expansion valve are arranged upstream, downstream, or in parallel with the evaporator of the vehicle air conditioning system in the refrigerant circuit. In this supplemental evaporator, additional energy is taken up from the refrigerant. The supplemental evaporator is arranged in a separate fluid guiding arrangement, which is preferably arranged in the engine compartment or another location in the vehicle surrounded by warm air. The fluid guiding arrangement is also called an evaporator box and it is provided with a closure, for example, in the form of a louver. This closure of the fluid guiding arrangement can be adjusted movably between the open and closed positions. Advantageously, a further air guiding device is arranged as a flowback closure on the other side of the supplemental evaporator, in order to isolate it in cooling mode and prevent an unintentional uptake of heat.

Preferably, the fluid guiding arrangement in addition to the supplemental evaporator also has a blower as a supplemental heat source, which draws or forces air through the supplemental evaporator when the closure is open.

The described system works conceptually as a heat pump with air-side switching similar to the typical prior art in regard to compact air conditioning systems. In heat pump mode, the air guiding device of the fluid guiding arrangement in the form of the closures is opened so that warm air flows through the supplemental evaporator and in this way additional heat is taken up from the refrigerant. This additional heat taken up is surrendered via the supplemental heat exchanger arranged in the vehicle air conditioning system to the air flowing into the vehicle for conditioning. In layouts without direct or free air passage, the air flow through the supplemental evaporator is adjusted by the blower.

In cooling mode, the air guiding devices of the fluid guiding arrangement are closed and the supplemental evaporator is isolated from the supplemental heat fluid flow.

In this way, no energy is taken up via the supplemental evaporator and no refrigerant is evaporated, so that the heat is taken up entirely by the evaporator of the vehicle air conditioning system while cooling the air flow being conditioned.

In another advantageous embodiment, the evaporator box is connected to an air inlet system. This system makes it possible to utilize various incoming air flows, for example, from the engine compartment or from the interior of the vehicle. For boosted efficiency of the heat pump mode, it is advantageous to convey warm air through the evaporator. Thanks to the air inlet system, incoming air can be drawn from the vehicle interior for example with the outside surroundings are cold. In this way, air at higher temperature than the surrounding temperature can be drawn in and used for heating the vehicle interior.

The benefits of the invention can be summarized as follows:

A heating or supplemental heating function is made possible in a largely conventional refrigerant circuit without additional switching valves as compared to conventional heat pump systems. The arrangements of the vehicle air conditioning system and the components of the vehicle air conditioning system in the vehicle is unchanged and the vehicle architecture is only slightly modified.

Thanks to the use of a conventional refrigerant circuit, amplified with a supplemental evaporator, a distinctly more economical system than conventional heat pumps and their complex layout is achieved.

The efficiency, especially at low outdoor temperatures, can be distinctly increased as compared to conventional heat pumps. Thus, it should be especially emphasized that a conventional air conditioning system can be used with no major adaptations.

BRIEF DESCRIPTION OF THE DRAWINGS

Further details, features and benefits of embodiments of the invention will emerge from the following description of sample embodiments making reference to the accompanying drawings. There are shown.

DETAILED DESCRIPTION OF EMBODIMENTS

Figure 1:
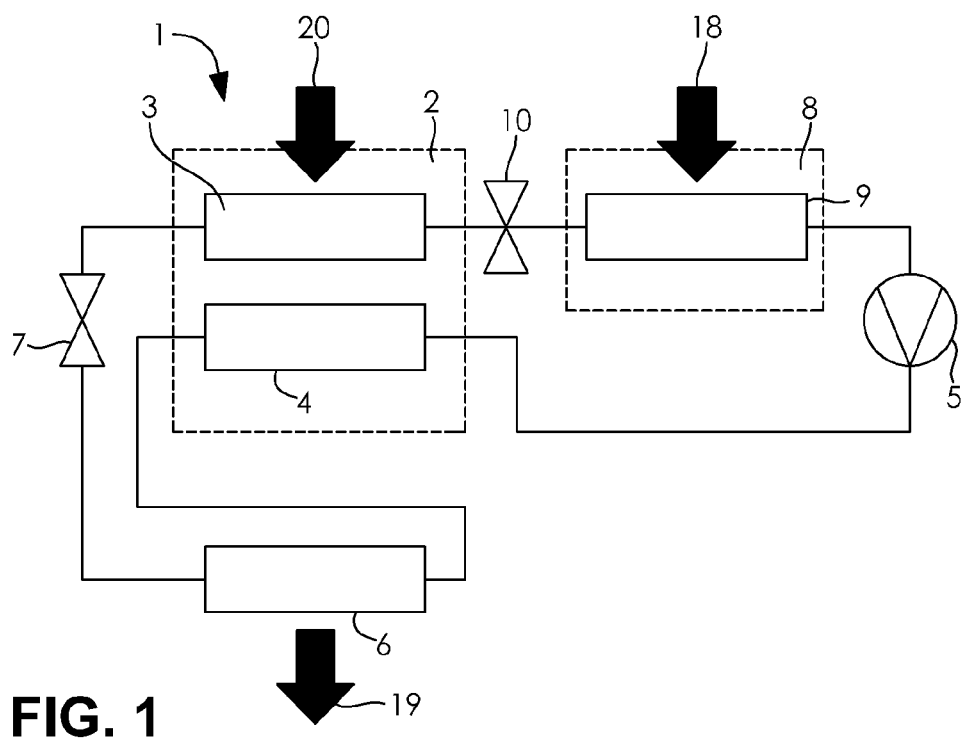
FIG. 1: Refrigerant circuit with a supplemental evaporator and a supplemental heat exchanger in a vehicle air conditioning system.

FIG. 1 shows a refrigerant circuit 1 according to a preferred embodiment of the invention. The refrigerant circuit 1 supplies an air conditioning system 2 for the conditioning of an air flow 20 for the heating and cooling of a vehicle cabin, not shown, and also provides for the dehumidification of the air supplied to the vehicle cabin when necessary. In the air conditioning system 2, there is arranged in the usual manner an evaporator 3 for the cooling and dehumidification of the air flow 20. Furthermore, a heat exchanger 4 is provided for the heating of the air flow 20. In familiar manner, furthermore, a compressor 5 and a condenser 6 as well as an expansion element 7 are arranged in the refrigerant circuit 1. The special feature of the refrigerant circuit 1 is that a heat pump function is implemented. For this, a supplemental evaporator 9 is provided in the refrigerant circuit 1 as a supplemental heat source in a fluid guiding arrangement 8. The fluid guiding arrangement 8 in this embodiment is designed as an air guiding arrangement and is arranged in the vehicle in an area with warmer air than the surrounding temperature, which is utilized in order to remove a portion of the heat from this warm air and contribute it to the refrigerant circuit 1. This heat is transformed by means of a heat pump function to a higher temperature level and utilized for heating of the air flow 20. For this, the fluid guiding arrangement 8 comprises the supplemental evaporator 9, which draws heat from the supplemental heat fluid flow 18, generally air of higher temperature than the surrounding temperature, by evaporating refrigerant. In order to set a corresponding specific evaporation temperature level for the supplemental evaporator 9, a supplemental expansion element 10 is placed upstream from the supplemental evaporator 9 in the refrigerant circuit 1.

Another feature of the refrigerant circuit 1 is that the heat exchanger 4 is arranged downstream from the compressor 5 for heating the air flow 20 in the air conditioning system 2. With the heat exchanger 4, the temperature level of the high-pressure flow of refrigerant downstream from the compressor 5 is utilized for heating the air flow 20 in the vehicle air conditioning system.

After the heat exchanger 4 is the condenser 6, in which further heat is removed in familiar fashion from the refrigerant circuit 1 by a waste heat fluid flow 19, which generally takes this waste heat away from the refrigerant circuit as an ambient air flow. The refrigerant is cooled or condensed and after this expanded in the expansion element 7 in the usual manner to the evaporation pressure and taken to the evaporator 3 of the vehicle air conditioning system, where the refrigerant circuit 1 is closed on itself.

The special feature of the refrigerant circuit 1, summarizing, consists in that the fluid guiding arrangement 8 is provided as a supplemental heat source for the fulfillment of the heat pump function in the refrigerant circuit 1 and furthermore the heat exchanger 4 as a supplemental condenser in the vehicle air conditioning system surrenders heat of the refrigerant at the evaporation end temperature level in the air conditioning system 2 to the air flow 20 for its heating.

Figure 2A:
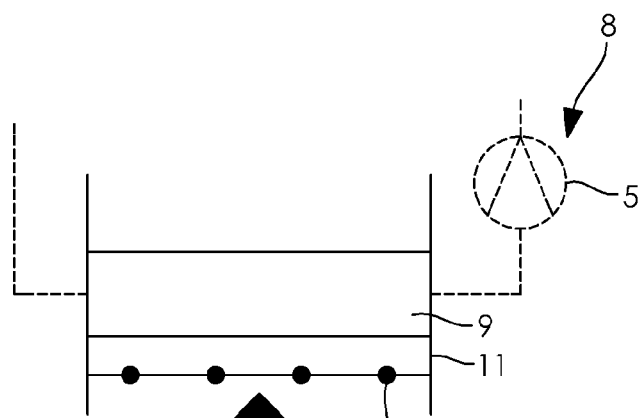
FIG. 2A: Fluid guiding arrangement with an inlet-side closure in a closed position.
Figure 2B:
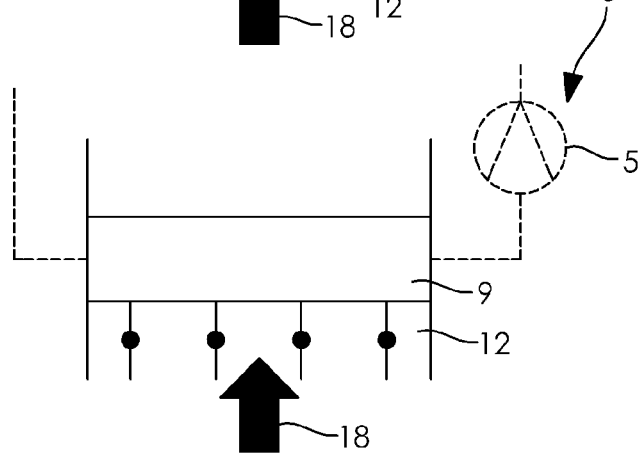
FIG. 2B: Fluid guiding arrangement with an inlet-side closure in an opened position.

In FIGS. 2A and 2B there are shown each time a fluid guiding arrangement 8 as air guiding arrangement as a supplemental heat source of the refrigerant circuit 1 in a detailed schematic. The fluid guiding arrangement 8 consists essentially of a housing 11, in which the supplemental evaporator 9 is arranged, and where a closure 12 of the fluid guiding arrangement 8 is provided, which can block off the supplemental heat fluid flow 18 through the supplemental evaporator 9.

In FIG. 2A the closure 12 is shown in the closed position, so that the supplemental heat fluid flow 18 cannot flow through the supplemental evaporator 9, which is realized for example in the cooling system mode. The supplemental evaporator 9 is tied into the refrigerant circuit 1 and the evaporated refrigerant from the supplemental heat evaporator 9 goes to the compressor 5 of the refrigerant circuit 1, not fully shown here.

In contrast with FIG. 2A, in FIG. 2B the fluid guiding arrangement 8 is shown with an opened position of the closure 12, so that the supplemental heat fluid flow 18 can flow unhindered through the supplemental evaporator 9, whereby heat from the supplemental heat fluid flow 18 can be taken up from the refrigerant for evaporation in the heat pump mode and can be utilized for heating of the air flow in the vehicle air conditioning system 2 for the heat pump function.

Figure 3:
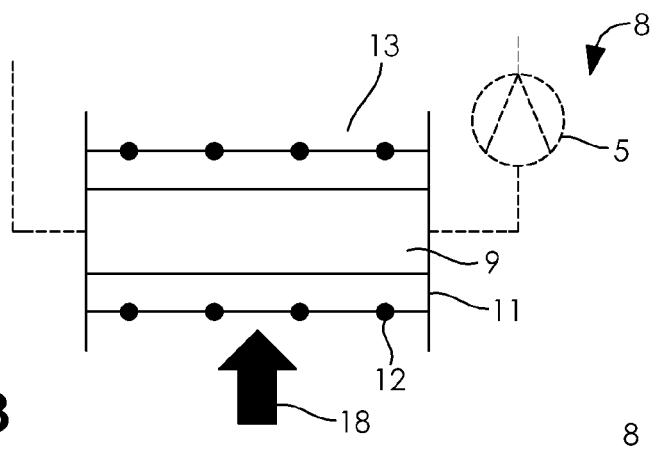
FIG. 3: Fluid guiding arrangement with an air inlet and an air outlet closure.
Figure 4:
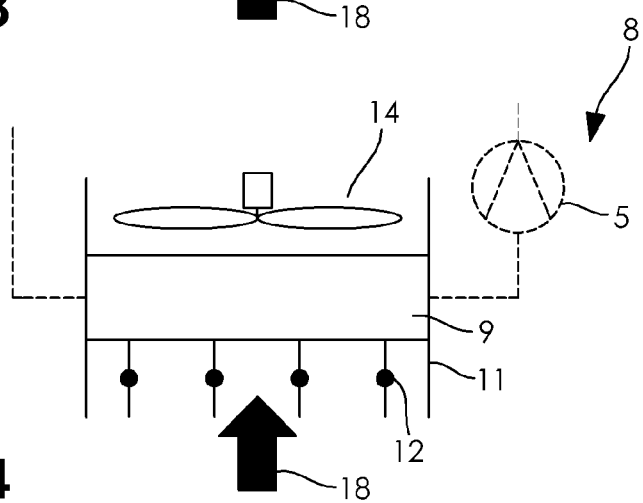
FIG. 4: Fluid guiding arrangement with an air inlet closure and a blower.

FIG. 3 and FIG. 4 show further preferred embodiments of the fluid guiding arrangement 8.

FIG. 3 shows, besides the closure 12 at the inlet side, also an outlet-side flowback closure 13. Thanks to the flowback closure 13, in the closed position of the closures 12, 13, the supplemental evaporator 9 can be decoupled entirely from the heat exchange with the air surrounding it by preventing the exchange of air. This is advantageous in the refrigeration mode of the refrigerant circuit 1.

FIG. 4, in contrast with FIG. 3, shows a blower 14 in an air outlet position, which in the opened position of the closure 12 draws the supplemental heat fluid flow 18 through the supplemental evaporator 9 and thus enables an intensive flow and efficient utilization of the supplemental heat fluid flow 18. The blower 14 here, represented in FIG. 4, is arranged in the heat fluid flow 18 upstream from the supplemental evaporator 9, but as an alternative it can also be arranged downstream from the supplemental evaporator 9.

Figure 5:
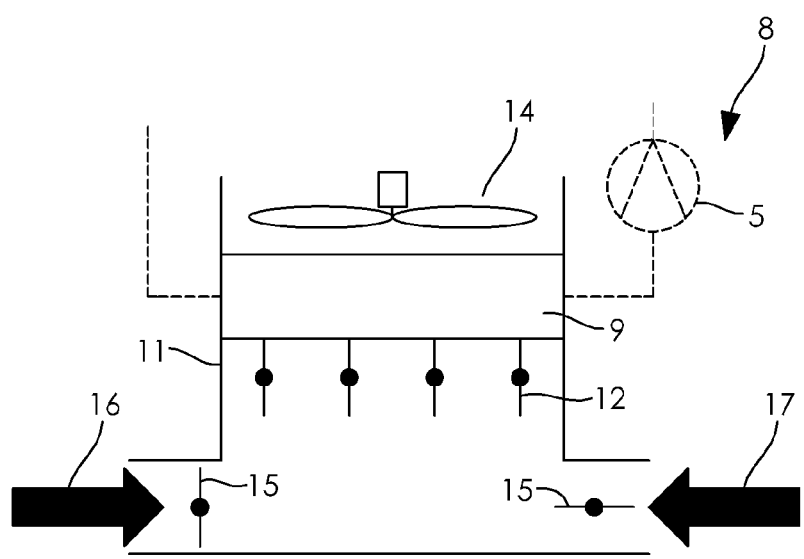
FIG. 5: Fluid guiding arrangement with two air inlet-side inlets.

Finally, FIG. 5 shows another advantageous variant of the fluid guiding arrangement 8. At the air inlet, a housing 11 is expanded by two connections for a circulating air 16 from a vehicle cabin or an engine compartment air 17 from the engine compartment. The circulating air 16 and the engine compartment air 17 serve in this case as the heat fluid flow 18, or a supplemental heat fluid flow, for the surrendering of heat in the supplemental evaporator 9. The connections for the circulating air 16 and the engine compartment air 17 can be controlled by means of valves 15, so that each variant of the heat fluid flow 18 is adjustable and either exclusively the circulating air 16 or exclusively the engine compartment air 17 or both can be utilized in freely selectable and adjustable ratios as the heat fluid flow 18.

LIST OF REFERENCE SYMBOLS

1 Refrigerant circuit
2 Air conditioning system
3 Evaporator
4 Heat exchanger
5 Compressor
6 Condenser
7 Expansion element
8 Fluid guiding arrangement as supplemental heat source
9 Supplemental evaporator
10 Supplemental expansion element
11 Housing
12 Closure
13 Flowback closure
14 Blower
15 Valves
16 Circulating air
17 Engine compartment air
18 Heat fluid flow
19 Waste heat fluid flow
20 Air flow

What is claimed is:

1. A refrigerant circuit for a vehicle air conditioning system with a heat pump function comprising:
   an evaporator configured to receive a first flow of air therethrough;
   a compressor in fluid communication with the evaporator;
   a condenser in fluid communication with the evaporator;
   an expansion element in fluid communication with the evaporator;
   a supplemental evaporator arranged upstream from the compressor in the refrigerant circuit, the supplemental evaporator disposed in a fluid guiding arrangement configured to receive a second flow of air separate from the first flow of air, wherein the fluid guiding arrangement is provided at an inlet of the supplemental evaporator, wherein a temperature of the second flow of air at the inlet of the supplemental evaporator is higher than a temperature of outside air surrounding the vehicle, and wherein the fluid guiding arrangement has a closure configured to selectively prevent all flow of the second flow of air through the supplemental evaporator;
   a supplemental expansion element arranged upstream from the supplemental evaporator and downstream from the evaporator in the refrigerant circuit, wherein all of a refrigerant exiting the evaporator always flows in series through the supplemental expansion element and the supplemental evaporator before entering the compressor; and
   a supplemental heat exchanger arranged between the compressor and the condenser in the refrigerant circuit for direct or indirect transfer of heat to a vehicle cabin, wherein the supplemental heat exchanger is directly connected to the condenser.

2. The refrigerant circuit according to claim 1, wherein the supplemental heat exchanger is arranged in the first flow of air.

3. The refrigerant circuit according to claim 2, wherein the supplemental heat exchanger is arranged downstream from the evaporator with respect to the first flow of air.

4. The refrigerant circuit according to claim 1, wherein the supplemental heat exchanger is configured for use in an electric vehicle or a hybrid vehicle and is positioned at a location wherein the supplemental heat exchanger can be used as a heating heat exchanger, and wherein the supplemental heat exchanger is positioned in a flow of air of the electric vehicle or the hybrid vehicle.

5. The refrigerant circuit according to claim 1, wherein the supplemental evaporator is configured for arrangement in an engine compartment or another location in the vehicle surrounded by warm air.

6. The refrigerant circuit according to claim 1, wherein the fluid guiding arrangement is further provided at an outlet of the supplemental evaporator and has a flowback closure at the outlet of the supplemental evaporator.

7. The refrigerant circuit according to claim 6, wherein the closure and the flowback closure are configured as flaps.

8. The refrigerant circuit according to claim 1, wherein the fluid guiding arrangement is configured as an air guiding arrangement and comprises a blower.

9. The refrigerant circuit according to claim 1, wherein the fluid guiding arrangement is configured as an air guiding arrangement with flaps for at least one of alternating a flow of circulating air or a flow of engine compartment air through the supplemental evaporator and simultaneously permitting the flow of circulating air and the flow of engine compartment air through the supplemental evaporator.

10. The refrigerant circuit according to claim 1, wherein the fluid guiding arrangement is an evaporator box.

* * * * *